(12) United States Patent
Yoshizawa

(10) Patent No.: US 9,325,900 B2
(45) Date of Patent: Apr. 26, 2016

(54) MANIPULATING SYSTEM CONSISTING OF WIRELESSLY CONNECTED MANIPULATING APPARATUS AND ELECTRONIC APPARATUS, POWER CONSUMPTION CONTROL METHOD, MANIPULATING APPARATUS, ELECTRONIC APPARATUS AND COMPUTER READABLE RECORDING MEDIUM HAVING PROGRAM THEREOF

(71) Applicant: CASIO COMPUTER CO., LTD., Shibuya-ku, Tokyo (JP)

(72) Inventor: Kenji Yoshizawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/490,295

(22) Filed: Sep. 18, 2014

(65) Prior Publication Data
US 2015/0103235 A1 Apr. 16, 2015

(30) Foreign Application Priority Data

Oct. 11, 2013 (JP) .................................. 2013-213391

(51) Int. Cl.
*H04N 5/232* (2006.01)
(52) U.S. Cl.
CPC ....... *H04N 5/23241* (2013.01); *H04N 5/23203* (2013.01)
(58) Field of Classification Search
CPC .................................................. H04N 5/2254
USPC .................................. 348/208.2, 374; 396/55
See application file for complete search history.

(56) References Cited

U.S. PATENT DOCUMENTS

2006/0139459 A1 6/2006 Zhong
2013/0235222 A1* 9/2013 Karn .................. H04N 5/23241
348/211.2

FOREIGN PATENT DOCUMENTS

| JP | 10228060 A | 8/1998 |
| JP | 2000050124 A | 2/2000 |
| JP | 2006165842 A | 6/2006 |
| JP | 2010153991 A | 7/2010 |
| KR | 1020050085440 A | 8/2005 |

OTHER PUBLICATIONS

Korean Office Action (and English translation thereof) dated Aug. 7, 2015, issued in counterpart Korean Application No. 9-5-2015-052988734.

* cited by examiner

*Primary Examiner* — Joel Fosselman
(74) *Attorney, Agent, or Firm* — Holtz, Holtz & Volek PC

(57) ABSTRACT

According to the present invention, there is provided a manipulating system including a manipulating apparatus and an electronic apparatus, which is manipulated from the manipulating apparatus by wireless. The manipulating system includes a checking unit for checking whether each of the manipulating apparatus and the electronic apparatus is in a state of moving or in a state of not moving, a determination unit for determining a use state of the manipulating system based on the state of the manipulating apparatus and the state of the electronic apparatus checked by the checking unit, and a control unit for controlling the manipulating system to perform a low-power operation of which power consumption is less than that of a normal operation which is required when manipulating the electronic apparatus by the manipulating apparatus if the determination unit determines that the use state of the manipulating system is a predetermined use state.

11 Claims, 7 Drawing Sheets

| CHECKED STATE | | SUPPOSED USE STATE | POWER | | |
|---|---|---|---|---|---|
| | | | CAMERA | | RC |
| RC | CAMERA | | DSP | IMAGING ELEMENT | LCD |
| STOP | MOVE | DURING SETTING OF CAMERA | OFF | OFF | OFF |
| MOVE | STOP | GOING TO TAKE PICTURE | ON | ON | ON |
| MOVE | MOVE | MOVING WITH CAMERA | ON | OFF | ON |
| STOP | STOP | NOT USING | OFF | OFF | OFF |

FIG. 5

| CHECKED STATE | | SUPPOSED USE STATE | POWER | | |
|---|---|---|---|---|---|
| | | | CAMERA | | RC |
| RC | CAMERA | | DSP | IMAGING ELEMENT | LCD |
| STOP | MOVE | DURING SETTING OF CAMERA | OFF | OFF | OFF |
| MOVE | STOP | GOING TO TAKE PICTURE | ON | ON | ON |
| MOVE | MOVE | MOVING WITH CAMERA | ON | OFF | ON |
| STOP | STOP | NOT USING | OFF | OFF | OFF |

FIG. 7

| CHANGE IN STATE | | BEHAVIOR PREDICTION | POWER | | |
|---|---|---|---|---|---|
| | | | CAMERA | | RC |
| RC | CAMERA | | DSP | IMAGING ELEMENT | LCD |
| S→M | S→S | GOING TO TAKE PICTURE | ON | ON | ON |
| | S→M | START TO MOVE CAMERA | ON | OFF | OFF |
| | M→M | CAMERA IS MOVING | ON | OFF | OFF |
| | M→S | FINISH INSTALLATION OF CAMERA | ON | ON | ON |
| M→M | S→S | PHOTOGRAPHER IS MOVING | ON | OFF | OFF |
| | S→M | START TO MOVE CAMERA | ON | OFF | OFF |
| | M→S | FINISH SETTING OF CAMERA | ON | ON | ON |
| M→S | S→S | PHOTOGRAPHER FINISHED MOVING | ON | ON | ON |
| | S→M | START TO MOVE CAMERA | ON | OFF | OFF |
| | M→M | CAMERA IS MOVING | ON | OFF | OFF |
| | M→S | FINISH INSTALLATION OF CAMERA | ON | ON | ON |
| S→S | S→M | START TO MOVE CAMERA | OFF | OFF | OFF |
| | M→S | FINISH INSTALLATION OF CAMERA | OFF | OFF | OFF |

MANIPULATING SYSTEM CONSISTING OF WIRELESSLY CONNECTED MANIPULATING APPARATUS AND ELECTRONIC APPARATUS, POWER CONSUMPTION CONTROL METHOD, MANIPULATING APPARATUS, ELECTRONIC APPARATUS AND COMPUTER READABLE RECORDING MEDIUM HAVING PROGRAM THEREOF

CROSS-REFERENCE TO RELATED APPLICATIONS

This application is based upon and claims the benefit of priority under 35 USC 119 of Japanese Patent Application No. 2013-213391 filed on Oct. 11, 2013, the entire disclosure of which is hereby incorporated by reference in its entirety for all purposes.

BACKGROUND OF THE INVENTION

1. Field of the Invention

The present invention relates to a technology for reducing power consumption in a manipulating system consisting of a manipulating apparatus and an electronic apparatus wirelessly connected to the manipulating apparatus.

2. Description of the Related Art

Conventionally, there have been technologies for reducing power consumption of digital cameras and, for example, Japanese Patent Application Laid-Open Publication No. 2000-50124 discloses a technology for stopping image display if no manipulation is performed for a predetermined period of time during displaying an image on an LCD of a digital camera and resuming the image display if a power switch or a display switch is manipulated in the state where the image display is being stopped. Further, Japanese Patent Application Laid-Open Publication No. 2006-165842 discloses a technology for determining that a camera is being used if a user changes the camera's position vertically or horizontally to decide composition even though the camera is not manipulated a predetermined period of time and disabling an auto power off function of the camera.

However, the above technologies consider only use patterns of general digital cameras. Thus, in the case of applying these technologies to a camera apparatus consisting of an imaging unit including picture-taking lenses and imaging elements and a manipulating unit including a monitor and a manipulating switch and functioning as a manipulating system for enabling manipulation of the imaging unit from the manipulating unit by wireless, there occurs a problem that they do not necessarily reduce power consumption effectively. This is because use patterns of the camera apparatus which is provided with the manipulating unit outside the imaging unit are different from those of general digital cameras and the camera apparatus is often used in a unique state where the imaging unit and the manipulating unit are separated at the time of taking pictures.

SUMMARY OF THE INVENTION

The present invention was made in light of the problem mentioned above, and an object of the present invention is to provide a technology for effectively reducing power consumption of a manipulating system such as a camera apparatus consisting of an imaging unit and a manipulating unit.

According to an aspect of the present invention, there is provided a manipulating system including a manipulating apparatus and an electronic apparatus, which is manipulated from the manipulating apparatus by wireless. The manipulating system includes a checking unit for checking whether each of the manipulating apparatus and the electronic apparatus is in a state of moving or in a state of not moving, a determination unit for determining a use state of the manipulating system based on the state of the manipulating apparatus and the state of the electronic apparatus checked by the checking unit, and a control unit for controlling the manipulating system to perform a low-power operation of which power consumption is less than that of a normal operation which is required when manipulating the electronic apparatus by the manipulating apparatus if the determination unit determines that the use state of the manipulating system is a predetermined use state.

BRIEF DESCRIPTION OF THE DRAWINGS

FIG. 5 shows descriptions of power control of the imaging device (a camera) and the manipulating device (a remote control).

FIG. 7 is a schematic diagram showing a control table.

DETAILED DESCRIPTION OF THE PREFERRED EMBODIMENT

Hereinafter, embodiments of the present invention will be described with reference to the drawings.

First Embodiment

The present embodiment relates to a camera apparatus corresponding to a product consisting of an imaging part including picture-taking lenses and imaging elements which are used in general digital cameras and a manipulating part outside the imaging part which includes a monitor and a manipulating switch. Specifically, the camera apparatus enables manipulation of the imaging part installed separately by the manipulating part at a location remote from the imaging part by wireless and functions as a manipulating system.

Figure 1:
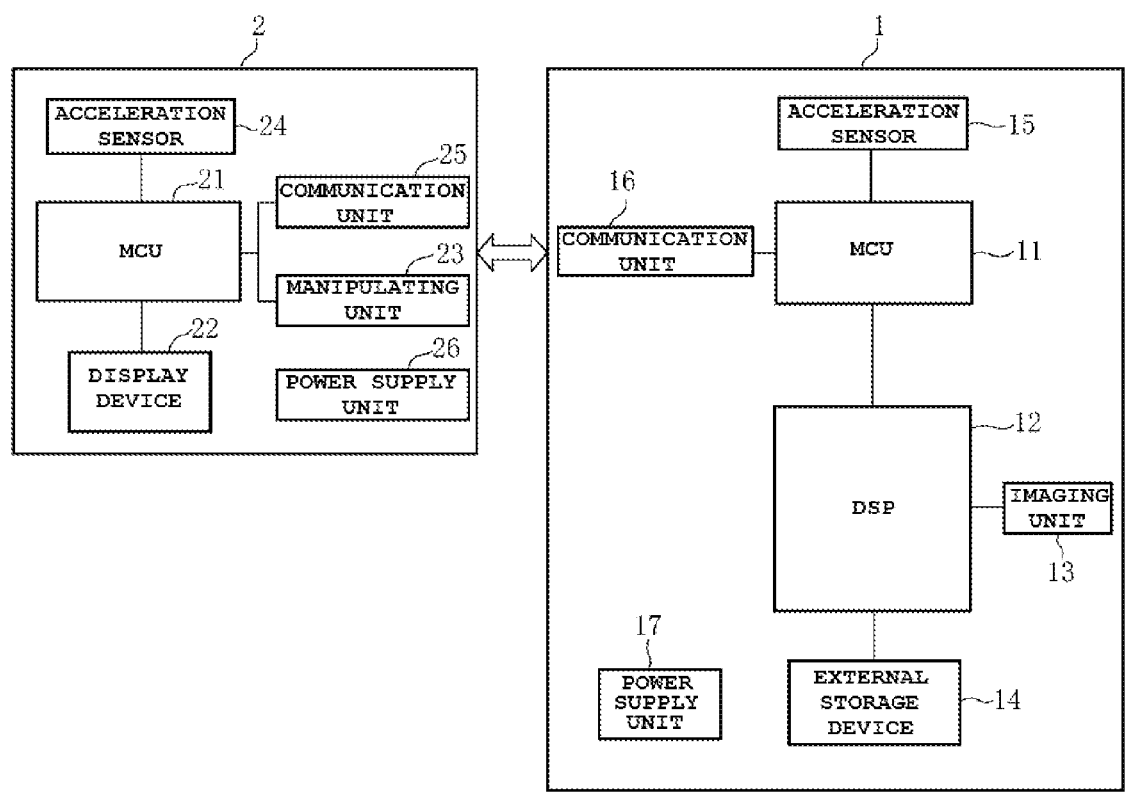
FIG. 1 is a block diagram showing the main part of an electrical configuration of an imaging device and a manipulating device forming a camera apparatus according to the present invention.

FIG. 1 is a block diagram showing the main part of an electrical configuration of a camera apparatus illustrated as an embodiment of the present invention and the camera apparatus consists of an imaging device 1 corresponding to the imaging part and a manipulating device 2 corresponding to the manipulating part which can transmit/receive data to/from each other by wireless communication.

First, the electrical configuration of the imaging device 1 is described. The imaging device 1 mainly consists of an MCU (Micro Controller Unit) 11, a DSP (Digital Signal Processor) 12, an imaging unit 13, an external storage device 14, an acceleration sensor 15, a communication unit 16, and a power supply unit 17.

The MCU 11 is a computer including a ROM (Read Only Memory), a RAM (Random Access Memory) which is a working memory, and the like, and controls each unit of the imaging device 1 in accordance with programs stored in the ROM.

The imaging unit 13 includes a CCD (Charge Coupled Device) or CMOS (Complementary Metal Oxide Semiconductor) type imaging element for capturing an image of a subject, a circuit for driving the imaging element, and an AFE (Analog Front End) for performing amplification and digitalization of imaging signals output from the imaging element.

The DSP 12 generates data of the captured image by performing a plurality of signal processing steps based on a particular program to the digitalized imaging signals output from the imaging unit 13 and also generates image data for recording compressed in accordance with the JPEG standard or the like at the time of picture-taking.

The external storage device 14 is a kind of memory card removable from the body of the imaging device 1 and the image data for recording generated by the DSP 12 at the time of picture-taking is stored in the external storage device 14.

The acceleration sensor 15 is a sensor for detecting acceleration of the imaging device 1 in three axes directions and signals detected by the acceleration sensor 15 are supplied to the MCU 11 via an amplifier or an A/D converter which is not shown in the drawing.

The communication unit 16 includes a communication circuit for performing short distance wireless communication with the manipulating device 2 via Bluetooth (Registered Trademark) and performs data communication with the manipulating device 2.

The power supply unit 17 includes a power supply cell (for example, a rechargeable battery such as nickel-hydrogen battery), a DC/DC converter, and the like, and supplies necessary power to each of the units. The power supply unit 17 also includes a power switch.

In the imaging device 1, the captured image data generated by the DSP 12 is sent to the manipulating device 2 via the communication unit 16 and the image data read out from the external storage device 14 in response to a request of the manipulating device 2 is sent to the manipulating device 2 while the MCU 11 drives the imaging unit 13. As will be described in the following, the MCU 11 performs power control of the imaging device 1 in response to a request from the manipulating device 2.

Then, the electrical configuration of the manipulating device 2 is described. The manipulating device 2 mainly consists of an MCU (Micro Controller Unit) 21, a display device 22, a manipulating unit 23, an acceleration sensor 24, a communication unit 25, and a power supply unit 26.

The basic features of the MCU 21 are similar to those of the MCU 11 and the MCU 21 controls each unit of the manipulating device 2 in accordance with programs stored in a ROM.

The display device 22 is a color liquid crystal monitor (hereinafter also referred to as an "LCD") and displays the captured image as a through-the-lens image and a variety of information such as a menu screen necessary for a user to set picture-taking conditions or various functions of the camera apparatus. The display device 22 also displays an image based on the image data for recording sent from the imaging device 1, i.e. a picture which was taken in the past and is being stored.

The manipulating unit 23 includes a plurality of manipulating switches such as a power switch or a shutter button.

The acceleration sensor 24 is a sensor for detecting acceleration of the manipulating device 2 in three axes directions and signals detected by the acceleration sensor 24 are supplied to the MCU 21 via an amplifier or an A/D converter which is not shown in the drawing.

The communication unit 25 includes a communication circuit for performing local-area wireless communication with the imaging device 1 via Bluetooth (Registered Trademark) and performs data communication with the imaging device 1.

The power supply unit 26 includes a power supply cell (for example, a rechargeable battery such as nickel-hydrogen battery), a DC/DC converter, and the like, and supplies necessary power to each of the units.

In the manipulating device 2, the MCU 21 sends a manipulation instruction received from the user by a particular manipulating switch of the manipulating unit 23 to the imaging device 1 via the communication unit 25 or controls the display device 22 to display a through-the-lens image received from the imaging device 1 via the communication unit 25. Further, the MCU 21 requests the imaging device 1 to perform various processes including power control and performs power control for the manipulating device 2.

Then, operations of the camera apparatus having the technical features are described. This is based on the premise that pairing between the imaging device 1 and the manipulating device 2 has already been completed via Bluetooth and the camera apparatus enters into a state of waiting for picture-taking once both of the devices turn ON. In other words, the following descriptions are based on the premise that the imaging device 1 starts to capture images of a subject at a predetermined frame rate and sends data of the captured images sequentially to the manipulating device 2 and the manipulating device 2 receives the data and displays through-the-lens images on the display device 22.

Hereinafter, we call the imaging device 1 a camera and the manipulating device 2 a remote control for convenience' sake.

(Operations of Remote Control)

Figure 2:
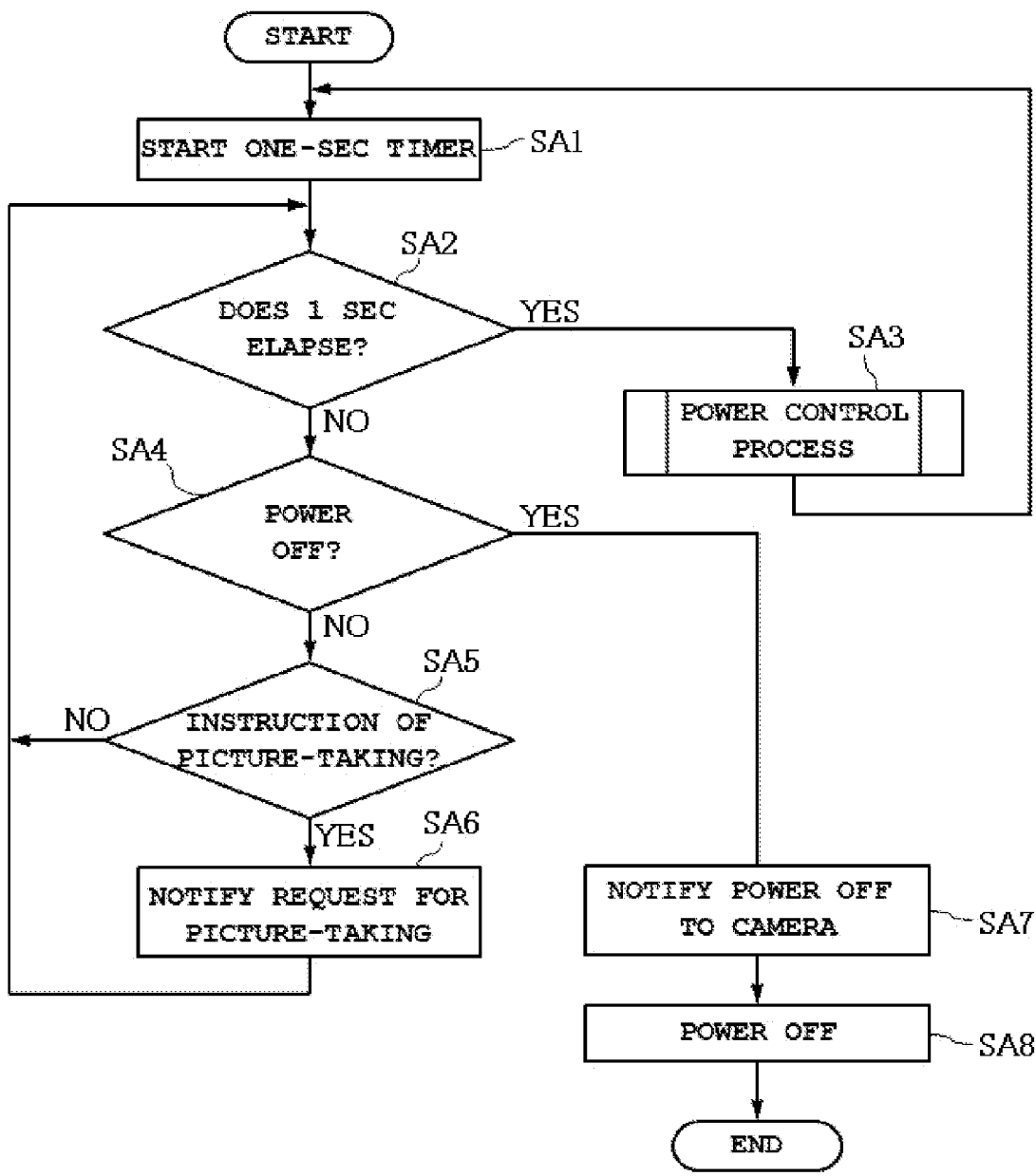
FIG. 2 is a flow chart showing operations of a manipulating device (a remote control) common to a first embodiment and a second embodiment of the present invention.

First, in the state of waiting for picture-taking, operations of the remote control (the manipulating device) 2 according to the present invention are explained. FIG. 2 is a flow chart showing processing performed by the MCU 21 in accordance with a program stored in the ROM.

After starting display of a through-the-lens image, the MCU 21 activates a one-second timer implemented by the internal clock (Step SA1), and every time one second elapses (Step SA2: YES), performs a power control process (Step SA3). This process controls power of both of the remote control 2 and the camera 1 and will be described in detail in the following.

While the elapsed time counted by the one-second timer does not reach one second (Step SA2: NO), the MCU 21 checks whether or not the user instructs to turn power off by manipulating the power switch and to take a picture by manipulating the shutter button (Steps SA4 and SA5).

If neither of the manipulations is performed (NO at Steps SA4 and SA5), the MCU 21 returns to Step SA2 and performs the power control process (Step SA3) when every second elapses (Step SA2: YES).

If there is an instruction to take a picture (Step SA5: YES), the MCU 21 sends a request signal for requesting the camera 1 to take a picture (Step SA6) and returns to Step SA2. If there is a manipulation for power off (Step SA4: YES), the MCU 21 notifies the camera 1 of power off (Step SA7), turns the power of the remote control 2 off (Step SA8) and then ends the processing.

Figure 3:
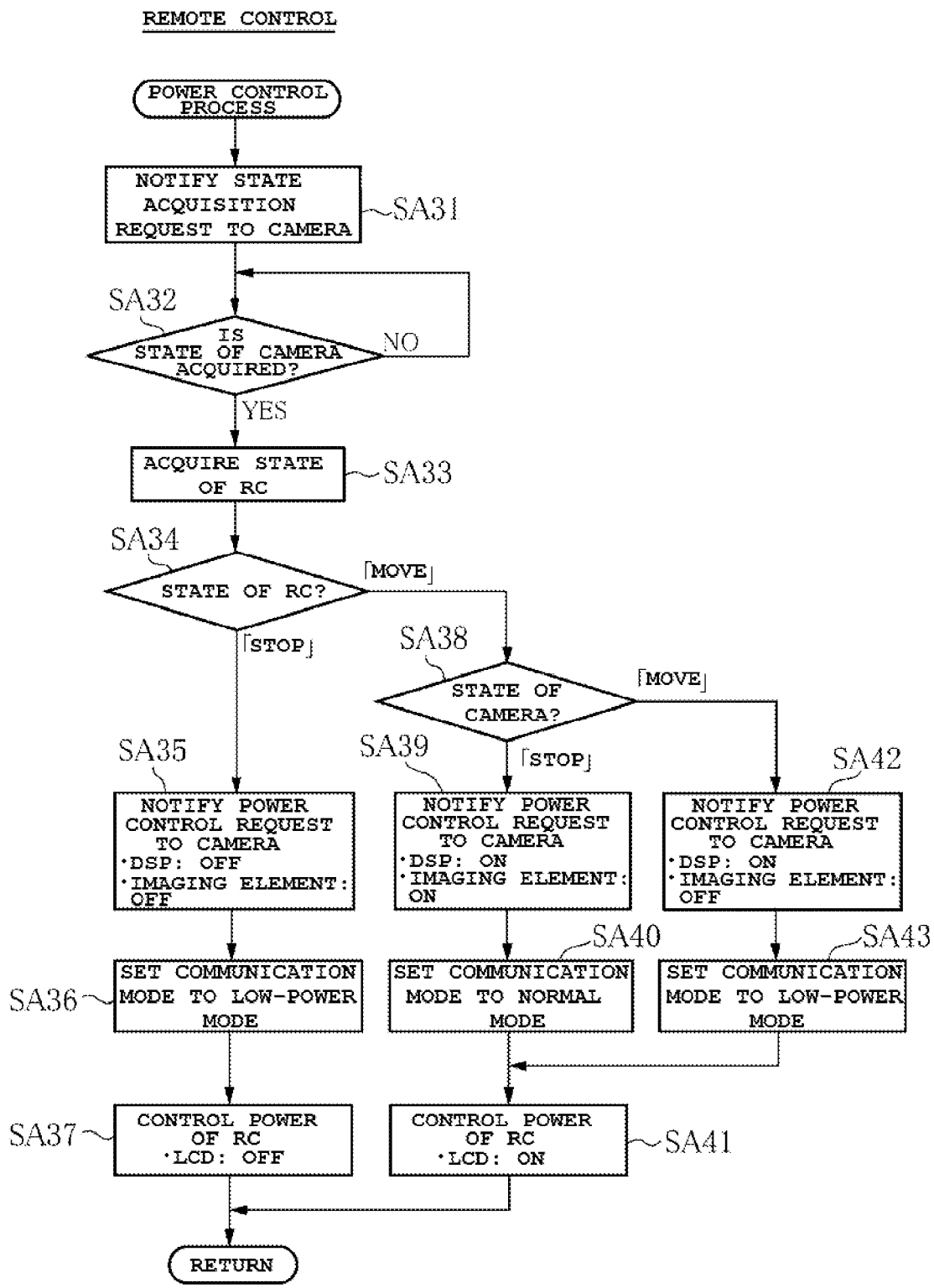
FIG. 3 is a flow chart showing a power control process according to the first embodiment of the present invention.

Next, the power control process performed every second by the MCU 21 at Step SA3 is explained in detail with reference to the flow chart of FIG. 3.

In the power control process, the MCU 21 sends a notification for requesting the camera (the imaging device) 1 to acquire information on its state (Step SA31). Here, the state indicates whether the camera moves or not and is one of a move state in which the camera 1 is moving and a stop state in which the camera 1 does not move. The notification at Step SA31 requests the camera 1 to acquire information on this kind of state and send this state information to the remote control 2 (also referred to as "RC" in the drawings for simplicity).

In response to the request, the camera 1 checks its state from value detected by the acceleration sensor 15 and sends state information indicating the checked state to the remote control 2 as will be described in the following.

The MCU 21 is on standby before obtaining the state of the camera 1 by receiving the state information (Step SA32: NO). If the state of the camera 1 is obtained (Step SA32: YES), the MCU 21 acquires information on a state of the remote control 2 (Step SA33). In other words, the MCU 21 checks whether the remote control 2 is in a move state or a stop state.

If the remote control 2 is in the stop state (Step SA34: STOP), the MCU 21 determines that a use state of the camera apparatus is a state in which the user is setting the camera 1 in a place or a state of not using the camera and notifies the camera 1 of a power control request as will be described below.

The MCU 21 requests the camera 1 to perform power control to turn off power of the DSP 12 and the imaging unit (an imaging element) 13 (multiple devices) (Step SA35). In other words, the MCU 21 requests the camera 1 to switch its operating mode in the state of waiting for picture-taking to a first low-power mode for reducing power consumption of both of the DSP 12 and the imaging unit (the imaging element) 13.

Then, the MCU 21 sets a communication mode of the communication unit 25 to a low-power mode (a so called sniff mode) for checking whether or not there is transmission from the other side (the camera 1) only at regular time intervals (Step SA36). If the communication mode is already set to the low-power mode, the communication mode is maintained.

Further, the MCU 21 performs power control to turn off power of a predetermined device, or the LCD 22 (Step SA37). In other words, an operating mode of the remote control 2 is switched to a low-power mode. If the power of the LCD 22 is already turned off, the power-off state is maintained.

On the other hand, if the remote control 2 is in the move state (Step SA34: MOVE), the MCU 21 performs different processes according to the states of the camera 1 as will be described below.

First, if the camera 1 is in the stop state (Step SA38: STOP), the MCU 21 determines that the use state of the camera apparatus is a state in which the user is going to take a picture and requests the camera 1 to perform power control for turning on the power of the DSP 12 and the imaging unit (the imaging element) 13 (for starting or continuing power supply) (Step SA39). In other words, the MCU 21 requests the camera 1 to switch its operating mode to a normal mode in which the DSP 12 and the imaging unit (the imaging element) 13 are turned on.

Then, the MCU 21 sets the communication mode of the communication unit 25 to a normal mode (a so called active mode) (Step SA40). If the communication mode is already set to the normal mode, the communication mode is maintained.

Further, the MCU 21 performs power control for turning on the power of the LCD 22 (Step SA41). In other words, the operating mode of the remote control 2 is switched to a normal mode in which the LCD 22 is turned on. If the power of the LCD 22 is already turned on, the power-on state is maintained.

Contrary to the above, if the camera 1 is in the move state (Step SA38: MOVE), the MCU 21 determines that the use state of the camera apparatus is a state in which the user is moving with the camera 1 and requests the camera 1 to perform power control for turning on the DSP 12 and turning off the imaging unit (the imaging element) 13 (Step SA42). In other words, the MCU 21 requests the camera 1 to switch its operating mode to a second low-power mode for reducing power consumption of only the imaging unit (the imaging element) 13.

Then, the MCU 21 sets the communication mode of the communication unit 25 to the low-power mode (Step SA43). If the communication mode is already set to the low-power mode, the communication mode is maintained.

Further, the MCU 21 performs power control for turning on the power of the LCD 22 (Step SA41). In other words, the operating mode of the remote control 2 is switched to the normal mode in which the LCD 22 is turned on. If the power of the LCD 22 is already turned on, the power-on state is maintained.

(Operations of Camera)

Figure 4:
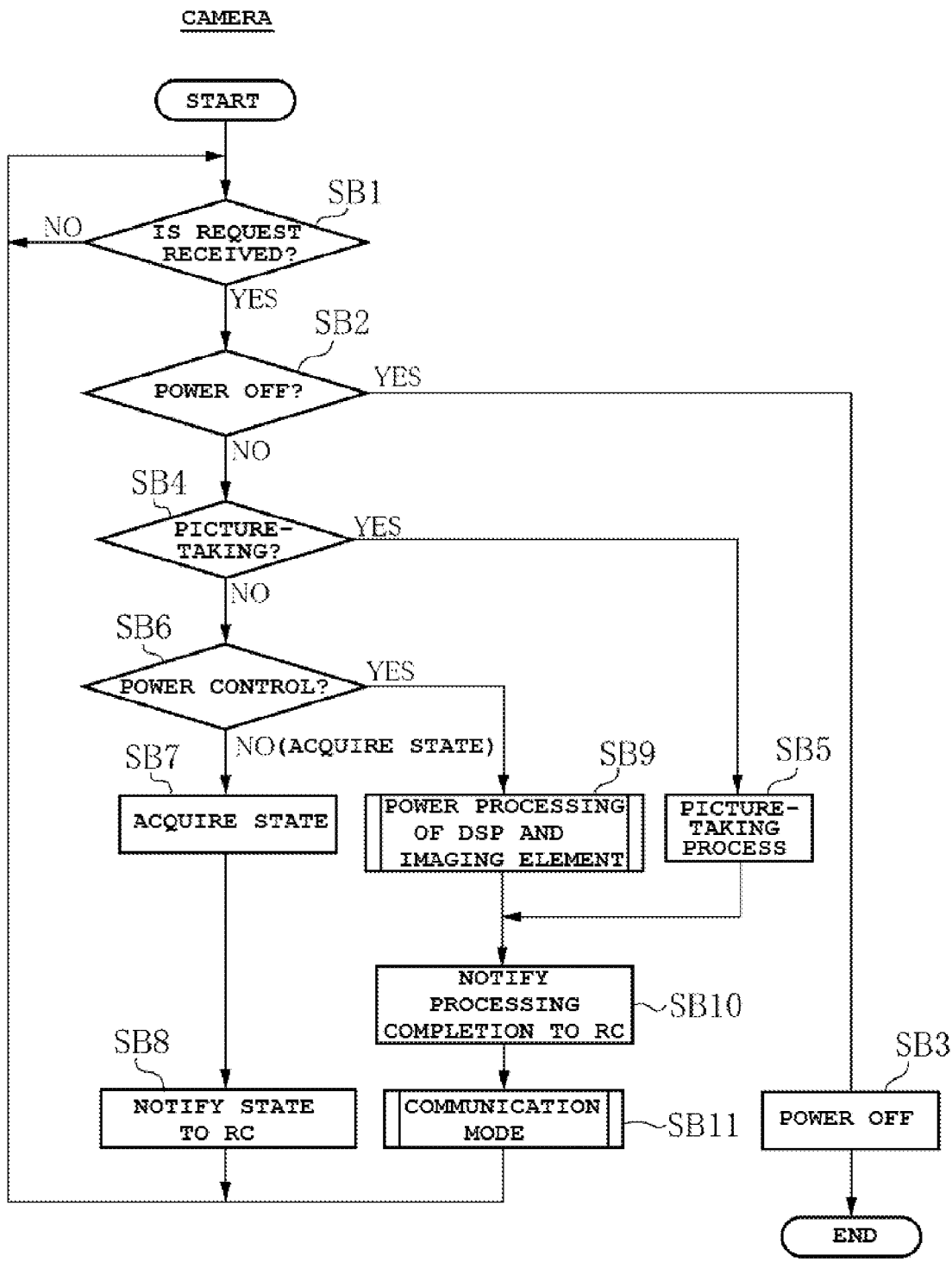
FIG. 4 is a flow chart showing operations of an imaging device (a camera) according to the first embodiment of the present invention.

Next, operations of the camera (the imaging device) 1 according to the present invention, which correspond to the process performed by the MCU 21 of the remote control 2, are explained. FIG. 4 is a flow chart showing processing performed by the MCU 11 of the camera 1 in accordance with a program stored in the ROM.

After starting to capture images at a predetermined frame rate in the state of waiting for picture-taking and to send the captured images to the remote control 2, the MCU 11 is in a state of waiting for request from the remote control 2 and checks whether or not the notification of power off (a power off request) is sent from the remote control 2 wirelessly and whether or not various requests including a picture-taking request are sent from the remote control 2 (Step SB1).

If a request is received from the remote control 2 (Step SB1: YES), the MCU 11 performs processing described below in accordance with the request.

If the request from the remote control 2 is the power off request (Step SB2: YES), the MCU 11 immediately turns off power of the camera 1 (Step SB3) and the processing ends.

If the request from the remote control 2 is the picture-taking request (Step SB4: YES), the MCU 11 performs a picture-taking process (Step SB5). In other words, the imaging unit 13 captures an image of a subject, the DSP 12 generates image data for recording, and the image data for recording is stored in the external storage device 14.

If the request from the remote control 2 is not the power control request but the request for acquiring the state of the camera 1 (Step SB6: NO), the MCU 11 checks (or acquires) the state of the camera 1 from a value detected by the acceleration sensor 15 (Step: SB7) and notifies the state to the remote control 2. In other words, the MCU 11 sends state information indicating the checked state to the remote control 2 (Step SB8). Then, the MCU 11 returns to Step SB1 and waits for a request from the remote control 2.

If the request from the remote control 2 is the power control request (Step SB6: YES), the MCU 11 performs power processing for the DSP 12 and the imaging element, i.e. imaging unit 13 (Step SB9).

Specifically, at Step SB9, if the remote control 2 is in the stop state and determines that the use state of the camera apparatus is the state in which the user is setting the camera 1 or the state of not using the camera 1, the MCU 11 turns off the power of the DSP 12 and the imaging unit (the imaging element) 13. In other words, the MCU 11 switches the operating mode of the camera 1 to the first low-power mode in which power consumption is the minimum. If the operating mode of the camera 1 is already set to the first low-power mode, the operating mode is maintained.

If the remote control 2 is in the move state, the camera 1 is in the stop state, and the remote control 2 determines that the user is going to take a picture, the DSP 12 and the imaging unit (the imaging element) 13 are turned on. In other words, the MCU 11 switches the operating mode of the camera 1 to the normal mode. If the operating mode of the camera 1 is already set to the normal mode, the operating mode is maintained.

If both of the camera 1 and the remote control 2 are in the move state and the remote control 2 determines that the user is moving with the camera 1, the DSP 12 is turned on and the imaging unit (the imaging element) 13 is turned off. In other words, the MCU 11 switches the operating mode of the camera 1 to the second low-power mode in which power consumption is between those in the normal mode and in the first low-power mode. If the operating mode of the camera 1 is already set to the second low-power mode, the operating mode is maintained.

FIG. 5 shows descriptions of power control of the DSP 12 and the imaging unit (the imaging element) 13 of the camera 1 according to the power processing described above and power control of the LCD 22 according to the power control processing for the remote control 2 together with corresponding states of the camera 1 and the remote control 2 and supposed use states of the camera apparatus.

After performing the power processing, the MCU 11 notifies the remote control 2 that the processing is completed (Step SB10).

Further, the MCU 11 switches a communication mode of the communication unit 16 to a mode similar to that of the remote control 2 (Step SB11). In other words, the communication mode is set to the low-power mode if the imaging unit (the imaging element) 13 is turned off at Step SB9, and the communication mode is set to the normal mode if the imaging unit (the imaging element) 13 is turned on at Step SB9.

Then, the MCU 11 returns to Step SB1, waits for a request from the remote control 2 and repeats the above processing. During this, the power control process (FIG. 3) is being performed by the remote control 2 every second and thus the MCU 11 performs the processing from Step SB6 to Step SB11 every second.

As described above, in the camera apparatus according to the present embodiment, the states of the camera 1 and the remote control 2 (the move state or the stop state) are checked from information acquired from the acceleration sensors 15 and 24 provided in the camera 1 and the remote control 2, respectively, during the state of waiting for picture-taking and the use state of the camera apparatus is determined.

In accordance with the determination, the operating mode of the camera 1 can be set to the first low-power mode or the second low-power mode and the operating mode of the remote control 2 can be set to the low-power mode. In other words, if it is determined that the use state of the camera apparatus is the state of setting or not using the camera 1 or the state in which the user is moving with the camera 1, the operating mode of the camera 1 is immediately switched to the first low-power mode or the second low-power mode and the operating mode of the remote control 2 is switched to the low-power mode according to the state. An operating mode of the camera apparatus can be properly set to a low-power mode in accordance with the use state of the camera apparatus supposed in advance (see FIG. 5).

Therefore, it is possible to effectively reduce power consumption of the camera apparatus consisting of the camera 1 and the remote control 2 while it is used in a unique use pattern of taking pictures by manipulating the remote control 2 separated from the camera 1 which is different from that of general digital cameras.

When the operating mode of the camera apparatus is set to the low-power mode, the power consumption can be reduced more effectively by setting the communication mode between the camera 1 and the remote control 2 to the low-power mode.

Further, the camera 1 is configured to control the DSP 12 and the imaging unit (the image element) 13 separately. If it is determined that both of the camera 1 and the remote control 2 are moving and the user is moving with the camera 1, the operating mode of the camera 1 is set to the second low-power mode for turning off only the imaging unit (the imaging element) 13 and the operating mode of the remote control 2 is set to the normal mode.

Thus, for example, in the case that the user performs picture-taking upon installing the camera 1 in a place, it is possible to take a picture immediately without waiting for start-up time of the DSP 12 to promote convenience and reduce power consumption.

Second Embodiment

Next, a second embodiment of the present invention is described. In the first embodiment, the MCU 21 of the remote control 2 performs the power control process every second as described above. According to the present embodiment, in the camera apparatus configured as described with respect to the first embodiment, the MCU 21 of the remote control 2 performs a power control process different from that of the first embodiment.

Figure 6:
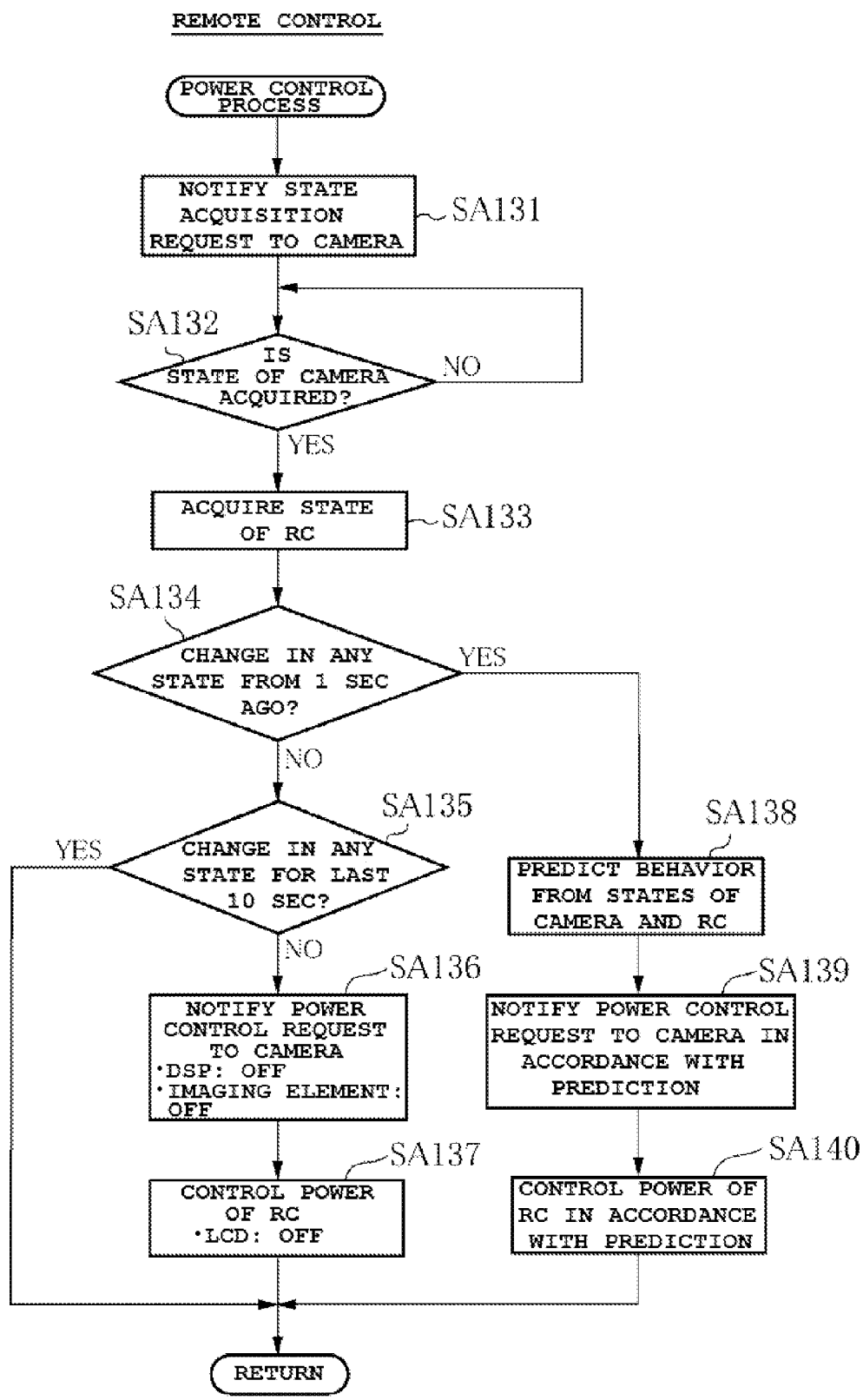
FIG. 6 is a flow chart showing a power control process according to the second embodiment of the present invention.

In the following, the power control process of the present embodiment is explained with respect to the flow chart shown in FIG. 6.

Similarly to the first embodiment, the MCU 21 first sends a notification for requesting the camera (the imaging device) 1 to acquire information on its state (the move state or the stop state) (Step SA131) and waits for receiving the state information from the camera 1 (Step SA132). If the state of the camera 1 is obtained (Step SA132: YES), the MCU 21 acquires information on a state of the remote control 2 (Step SA133). This is the same as the first embodiment.

Then, according to the present embodiment, the MCU 21 checks whether the state of the camera 1 or the remote control changes from one second ago, i.e. from the time when the previous power control process was performed (Step SA134).

Here, if there is no change in the states of both the camera 1 and the remote control 2 (Step SA134: NO), the MCU 21 further checks whether or not the states of both sides have changed for the last ten seconds (Step SA135). This is performed by storing the states of the camera 1 and the remote control 2 checked by the MCU 21 in the power control process performed for the last ten seconds in a RAM which is a working memory.

If the state of at least one of the camera 1 and the remote control 2 has changed for the last ten seconds (Step SA135: YES), the MCU 21 ends the power control process and returns to the processing of FIG. 2 described above. In other words, the operating modes of the camera 1 and the remote control 2 (the normal mode or the low-power mode) are maintained.

Contrary to the above, if the states of both of the camera 1 and the remote control 2 have not changed for the last ten seconds (Step SA135: NO), the MCU 21 determines that the camera apparatus is in a non-manipulating state and requests the camera 1 to perform power control for turning off the power of the DSP 12 and the imaging unit (imaging element) 13 (Step SA136).

If the operating mode of the camera 1 is the normal mode or the second low-power mode, the operating mode is switched to the first low-power mode. If the operating mode is already set to the first low-power mode, the operating mode is maintained.

Further, the MCU 21 performs power control for turning off the power of the LCD 22 (Step SA137). In other words, if the operating mode of the remote control 2 is not the low-power mode at this point of time, the operating mode is switched to the low-power mode.

If the state of at least one of the camera 1 and the remote control 2 has changed from one second ago (Step SA134: YES), the MCU 21 performs processing described below with reference to a control table shown in FIG. 7, which is stored in a ROM of the MCU 21.

This control table shows relations among predetermined patterns of changes in the states of the camera 1 and the remote control 2 (including no change), behaviors of the user which are predictable in advance (behavior prediction), descriptions of power control of the DSP 12 and the imaging unit (the imaging element) 13 of the camera 1, and descriptions of power control of the LCD 22 of the remote control 2.

The MCU 21 refers to the control table and predicts a behavior of the user (a photographer) from changes in the states of the camera 1 and the remote control 2 (Step SA138). In other words, the MCU 21 predicts the user's behavior by checking a description of a behavior corresponding to changes in the states of the camera 1 and the remote control 2 in the control table.

Here, the description of a behavior which can be predicted by the MCU 21 is one of seven patterns: starting to move the camera; while the camera is moving; finish of installation of the camera; while the photographer is moving; while the photographer and the camera are moving; finish of setting of the camera; and when the photographer finished moving, as shown in FIG. 7.

For example, if the state of the camera 1 changes from "S (stop) to S (stop)" and the state of the remote control 2 changes from "S (Stop) to M (move)", the MCU 21 predicts that the user is going to take a picture. If the state of the camera 1 changes from "S to M", the MCU 21 predicts that the user starts to move the camera 1 regardless of changes in the state of the remote control 2.

Then, referring to the control table, the MCU 21 determines how to control the power of the DSP 12 and the imaging unit (the imaging element) 13 of the camera 1 in accordance with the prediction described above and notifies the camera 1 of a request for the power control determined as above (Step SA139). Specific descriptions of the power control are shown in FIG. 7. By this, the MCU 21 controls the operating mode of the camera 1 to be one of the normal mode, the first low-power mode and the second low-power mode.

Exceptionally, at Step SA139, if the prediction is "Start to move camera", it is determined how to control the power of the DSP 12 and the imaging unit (the imaging element) 13 of the camera 1 with consideration of the changes in the state of the remote control 2 as shown in FIG. 7. In other words, if the state of the remote control 2 changes from "S to M", "M to M" or "M to S", only the imaging unit (the imaging element) 13 is turned off, but if the state of the remote control 2 changes from "S to S", both of the DSP 12 and the imaging unit (the imaging element) 13 are turned off.

Then, the MCU 21 determines how to control the power of the LCD 22 of the remote control 2 in accordance with the prediction described above referring to the control table and performs the power control for the LCD as determined above (Step SA140). Specific descriptions of the power control are shown in FIG. 7. Then, the MCU 21 ends the power control process and returns to the processing of FIG. 2.

As above, according to the power control process of the present embodiment, the MCU 21 predicts the user's behavior based on the changes in the states of the camera 1 and the remote control 2, sets the operating mode of the camera 1 to the first low-power mode or the second low-power mode, and sets the operating mode of the remote control 2 to the low-power mode properly in accordance with the prediction.

Therefore, according to the present embodiment, it is possible to perform power control more precisely in accordance with the use state of the camera apparatus in comparison with the first embodiment. Further, by controlling power based on the prediction of behaviors of the user (the photographer), it is possible to immediately start picture-taking when the user is going to take a picture.

Although the communication mode between the camera 1 and the remote control 2 is not controlled during the power control process in the above description, it is desirable to set the communication mode between the camera 1 and the remote control 2 to the low-power mode when the operating mode of the camera apparatus is set to the low-power mode.

In this case, it is desirable to set the communication mode to the low-power mode when the imaging unit (the imaging element) 13 of the camera 1 is turned off at Steps SA136 and SA139, and set the communication mode to the normal mode when the imaging unit (the imaging element) 13 of the camera 1 is turned on at Step SA139.

According to the first and the second embodiments of the present invention, the operating mode of the camera 1 is properly set to the first or the second low-power mode and the operating mode of the remote control 2 is properly set to the low-power mode to reduce power consumption of the camera apparatus during the state of waiting for picture-taking. However, the present invention can be configured to set the operating mode of the camera 1 to the normal mode all the time or set the operating mode of the remote control 2 to the normal mode all the time.

Although it has been described above that the camera 1 and the remote control 2 communicate via Bluetooth (Registered Trademark), the communication technology is not limited to this and other technologies such as Wi-Fi can be used.

Further, although it has been described above with respect to the first and the second embodiments that the MCU 21 of the remote control 2 controls the operating mode of the camera 1 and the operating mode of the remote control 2, the MCU 11 of the camera 1 may control the operating mode of the camera 1 and the operating mode of the remote control 2 according to embodiments.

Specifically, the MCU 11 can check the states of the camera 1 and the remote control 2, determine the use state of the camera apparatus based on the checked states, and set the operating mode of the camera 1 to the first or the second low-power mode and the operating mode of the remote control 2 to the low-power mode properly according to the determination.

In this case, the MCU 21 of the remote control 2 can acquire information on the state of the remote control 2 in response to a request from the camera 1, send the state information to the camera 1 and control the power of the LCD 22 in response to a request from the camera 1.

The technical features of the camera 1 and remote control 2 are not limited to the embodiments described above and, for example, the camera 1 can be realized by a general digital camera if it has a wireless data communication function. In this case, the general digital camera may have an operating mode for performing the processing shown in FIG. 4 separately from a picture-taking mode, which is a basic operating mode, or as a sub-operation of the picture-taking mode.

In addition, the camera 1 can be any type of camera if it can be installed in a place separated from the remote control 2, for example, a headset type camera which can be mounted on the user's head using an assistant tool. In this case, the user can set a use state for indicating whether or not the user carries the camera 1 by using the remote control 2 and the camera 1 and the remote control 2 can perform the processing described above only if the user does not carry the camera 1.

The remote control 2 can also be any type of remote control if it has a wireless data communication function, for example, a wrist watch type portable data terminal, a so-called smart phone (high performance mobile phone), or the like.

Although the present invention is applied to the camera apparatus consisting of the camera 1 (the imaging device) and the remote control 2 (the manipulating device) in the above description, the present invention is applicable to any manipulating system if it includes a manipulating apparatus and an electronic apparatus wirelessly connected to each other without limitations. Thus, it is possible to effectively reduce power consumption of the manipulating system.

The manipulating system may include a music player (an electronic apparatus) and a headphone (a manipulating apparatus) connected to the music player via Bluetooth (Registered Trademark) or the like, which includes manipulating buttons for manipulating the music player.

While the present invention has been described with reference to the preferred embodiments, it is intended that the invention be not limited by any of the details of the description therein but include all the embodiments which fall within the scope of the appended claims.

What is claimed is:

1. A manipulating system including a manipulating apparatus and an electronic apparatus which is configured to be wirelessly manipulated from the manipulating apparatus, the system comprising:
   a checking unit for checking whether each of the manipulating apparatus and the electronic apparatus is in a state of moving or in a state of not moving;
   a determination unit for determining a use state of the manipulating system based on the state of the manipulating apparatus and the state of the electronic apparatus checked by the checking unit; and
   a control unit for controlling the manipulating system to perform a low-power operation of which power consumption is less than power consumption of a normal operation which is required when the electronic apparatus is manipulated by the manipulating apparatus, in a case in which the determination unit determines that the use state of the manipulating system is a predetermined use state.

2. The system of claim 1, wherein the determination unit determines the use state of the manipulating system based on changes in the state of the manipulating apparatus and the state of the electronic apparatus.

3. The system of claim 1, wherein the control unit stops power supply to both of a predetermined device of the manipulating apparatus and a predetermined device of the electronic apparatus when controlling the manipulating system to perform the low-power operation.

4. The system of claim 3, wherein the electronic apparatus includes a plurality of predetermined devices that are candidates to which power supply is to be stopped, and the control unit stops power supply to one or more of the plurality of predetermined devices based on the determination by the determination unit.

5. The system of claim 1, wherein the low-power operation of the manipulating system includes setting a mode of wireless communication between the manipulating apparatus and the electronic apparatus to a low-power mode in which power consumption is less than power consumption in a normal mode.

6. The system of claim 1, wherein the electronic apparatus is an imaging device which includes an imaging unit for capturing an image of a subject, which captures the image of the subject in response to wireless manipulation from the manipulating apparatus, and which sends the captured image to the manipulating apparatus, and
   the manipulating apparatus includes a display unit for displaying the captured image received from the imaging device and a manipulation unit for manipulating the imaging device to capture the image.

7. A method of controlling power consumption of a manipulating system including a manipulating apparatus and an electronic apparatus which is configured to be wirelessly manipulated from the manipulating apparatus, the method comprising:
   checking whether each of the manipulating apparatus and the electronic apparatus is in a state of moving or in a state of not moving;
   determining a use state of the manipulating system based on the checked state of the manipulating apparatus and the checked state of the electronic apparatus; and
   controlling the manipulating system to perform a low-power operation of which power consumption is less than power consumption of a normal operation which is required when the electronic apparatus is manipulated by the manipulating apparatus, in a case in which it is determined that the use state of the manipulating system is a predetermined use state.

8. A manipulating apparatus which is included in a manipulating system comprising the manipulating apparatus and an electronic apparatus which is configured to be wirelessly manipulated from the manipulating apparatus, the manipulating apparatus comprising:
   a checking unit for checking whether each of the manipulating apparatus and the electronic apparatus is in a state of moving or in a state of not moving;
   a determination unit for determining a use state of the manipulating system based on the state of the manipulating apparatus and the state of the electronic apparatus checked by the checking unit; and
   a control unit for controlling the electronic apparatus to perform a low-power operation of which power consumption is less than power consumption of a normal operation which is required when the electronic apparatus is manipulated by the manipulating apparatus, in a case in which the determination unit determines that the use state of the manipulating system is a predetermined use state.

9. The apparatus according to claim 8, wherein:
   the electronic apparatus is an imaging device which includes an imaging unit for capturing an image of a subject, which captures the image of the subject in response to wireless manipulation from the manipulating apparatus, and which sends the captured image to the manipulating apparatus, and the manipulating apparatus includes a display unit for displaying the captured image received from the imaging device and a manipulation unit for manipulating the imaging device to capture the image.

10. A method of controlling power consumption of a manipulating apparatus which is included in a manipulating system comprising the manipulating apparatus and an electronic apparatus which is configured to be wirelessly manipulated from the manipulating apparatus, the method comprising:

checking whether each of the manipulating apparatus and the electronic apparatus is in a state of moving or in a state of not moving;

determining a use state of the manipulating system based on the checked state of the manipulating apparatus and the checked state of the electronic apparatus; and controlling the manipulating system to instruct the electronic apparatus to perform a low-power operation of which power consumption is less than power consumption of a normal operation which is required when the electronic apparatus is manipulated by the manipulating apparatus, in a case in which it is determined that the use state of the manipulating system is a predetermined use state.

11. A non-transitory recording medium having stored thereon a computer-readable program that is executable by a computer of a manipulating apparatus which is included in a manipulation system comprising the manipulating apparatus and an electronic apparatus which is configured to be wirelessly manipulated from the manipulating apparatus, wherein the program is executable by the computer to control the computer to perform functions comprising:

checking whether each of the manipulating apparatus and the electronic apparatus is in a state of moving or in a state of not moving;

determining a use state of the manipulating system based on the checked state of the manipulating apparatus and the checked state of the electronic apparatus; and controlling the manipulating system to instruct the electronic apparatus to perform a low-power operation of which power consumption is less than power consumption of a normal operation which is required when the electronic apparatus is manipulated by the manipulating apparatus, in a case in which it is determined that the use state of the manipulating system is a predetermined use state.

* * * * *